United States Patent [19]

Marsch

[11] 4,026,675
[45] May 31, 1977

[54] HEAT EXCHANGER FOR NUCLEAR REACTOR INSTALLATIONS

[75] Inventor: Hans-Dieter Marsch, Dortmund-Oespel, Germany

[73] Assignee: Friedrich Uhde GmbH, Dortmund, Germany

[22] Filed: June 23, 1975

[21] Appl. No.: 589,436

[30] Foreign Application Priority Data

July 1, 1974 Germany .......................... 2431478

[52] U.S. Cl. ........................... 23/288 M; 23/288 K; 122/32; 165/141; 165/157; 176/39; 176/65

[51] Int. Cl.² ........................ B01J 8/06; F22B 1/00; F28D 7/10; G21C 19/28

[58] Field of Search ......... 23/288 M, 288 K, 288 L, 23/288 R, 288 US, 289; 48/196 A; 122/32, 37; 165/140, 141, 157; 176/39

[56] References Cited

UNITED STATES PATENTS

| | | | |
|---|---|---|---|
| 3,126,322 | 3/1964 | Suttle, Jr. et al. .............. | 176/39 X |
| 3,144,312 | 8/1964 | Mertens ........................... | 23/289 X |
| 3,274,978 | 9/1966 | Palchik et al. .............. | 23/288 M X |
| 3,541,729 | 11/1970 | Dantowitz .................... | 23/288 R X |
| 3,751,228 | 8/1973 | Semenov ..................... | 23/288 M X |

*Primary Examiner*—Joseph Scovronek
*Attorney, Agent, or Firm*—Malcolm W. Fraser

[57] ABSTRACT

A heat exchanger for a nuclear reactor of the cavern type comprises a double walled vessel disposed within a steel liner. The vessel contains a large number of reaction tubes provided with a catalyst through which the material to be reformed flows. The outlet pipes of the reaction tubes act as a heat exchanger in the outer space of the vessel, which is filled with water. The vessel rests upon a bracket on the lower part of the liner, and the space between the liner and vessel in the region of the bracket is sealed by a double flange structure. At the top of the vessel, seal is effected by a cover, membrane ring, and a double flange arrangement. The annular space between the liner and vessel is sealed by a packing against the recycle gas nozzle leading from the interior of the vessel.

5 Claims, 1 Drawing Figure

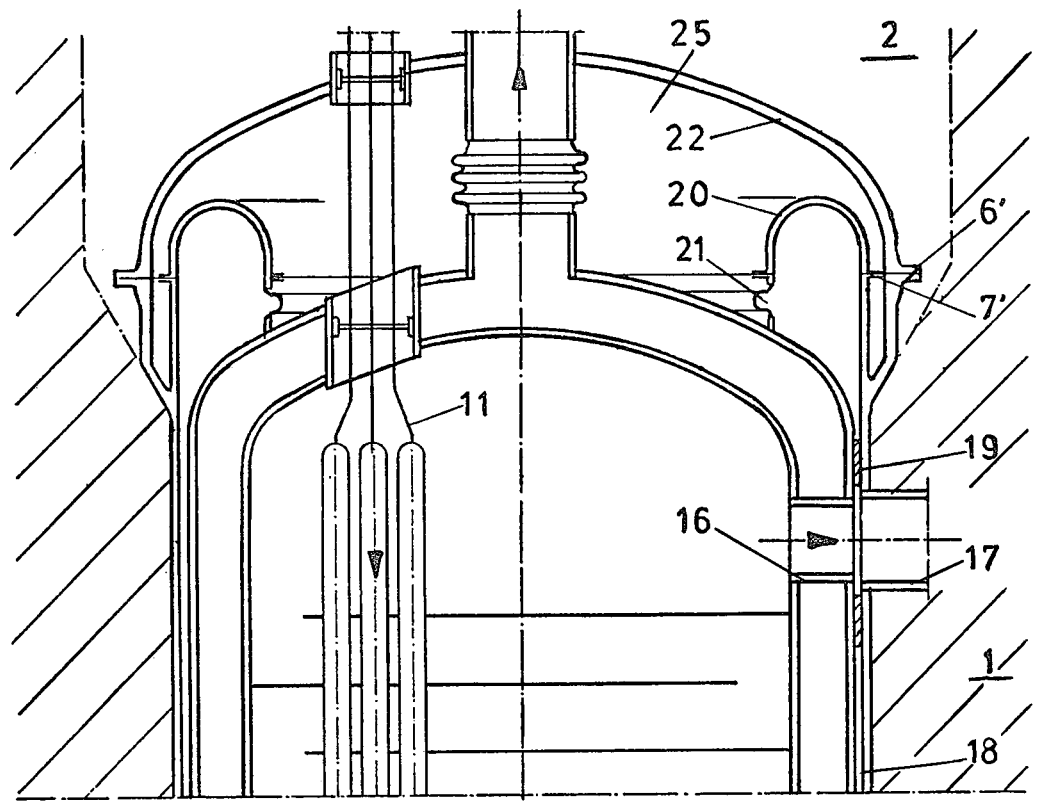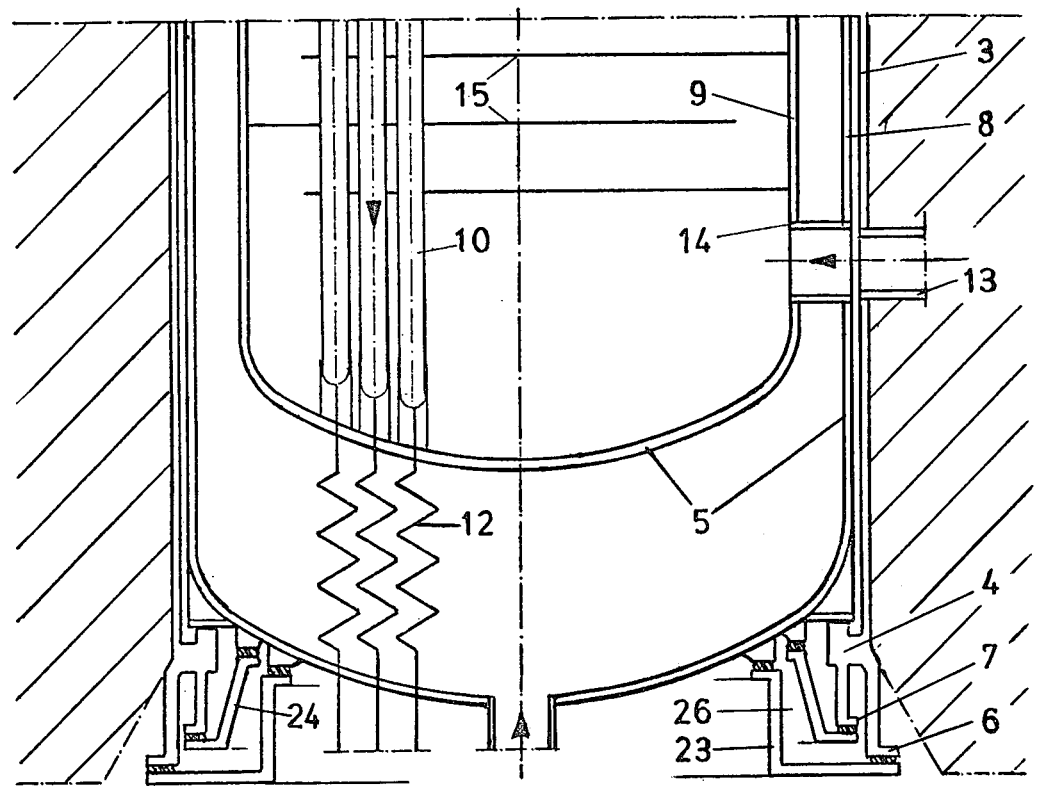

HEAT EXCHANGER FOR NUCLEAR REACTOR INSTALLATIONS

BACKGROUND OF THE INVENTION

The invention concerns a heat exchanger which is to be installed in a nuclear reactor of the cavern type, the heat exchanger being located in a cavern with an impermeable steel liner, and having a large number of reaction tubes filled with reforming catalyst. The material to be subjected to reforming, mostly hydrocarbons, flows through this reforming catalyst. The reaction tubes are heated by the reactor recycle gas.

Heat exchangers of the type mentioned utilize the waste heat of a nuclear reactor in order to carry out chemical processes. With such heat exchangers, it is necessary to take into consideration the mode of operation of the catalytic high-temperature reaction and to conform to the safety specifications for installations with high-temperature nuclear reactors.

It is known that the nuclear fuel elements of a nuclear reactor are cooled with fluid, for example helium. The cooling fluid attains a temperature of 950° C. This cooling fluid, hereafter referred to as recycle gas, is then withdrawn from the reactor where its temperature is lowered to about 200° to 300° by transferring its heat to one or more process fluids and then returned to the reactor core to be reheated.

The equipment in which the recycle gas circulates must be doubly protected against leakage toward the outside, since it inevitably contains a certain quantity of radioactive substances.

As is commonly known, the equipment that transfers the waste heat of the nuclear reactor, the heat exchanger, is arranged radially in caverns in the pre-stressed concrete that surrounds the nuclear reactor core. The caverns have a steel lining, or liner, that has at least one cover plate above and below. Appropriate reaction tubes are arranged in the heat exchanger if the waste heat of the nuclear reactor is to be used for carrying out chemical processes. The reaction tubes for the endothermic catalytic high temperature reaction, for example methane reforming, are filled with catalyst pellets. The gas to be reformed passes downwardly through the reaction tubes and is simultaneously heated with the hot recycle gas in order to maintain the endothermic reaction. Differing film and heat transfer coefficients occur inevitably because of irregularities in the catalyst filling and differing reaction rates and gas velocities.

The result is that the tube is subjected to a varying thermal stress and that, in places, this tube may be overheated and destroyed. Because of the specific high loading of the reaction tube and the quality of the material employed, the tubes cannot all have the same service life and some will become defective before others.

In view of the fact that a multitude of reaction tubes is located in a cavern of the pre-stressed concrete wall of a high temperature nuclear reactor, it is particularly important to be able to block the inlet and outlet pipes, either individually or in sections, so that damage to the reaction tubes will entail the shutting down only of the tube or section involved. Interim repairs are extremely difficult and lead to costly shutdown periods. In addition, it is necessary to provide a double seal toward the outside for the recycle gas stream. As is known, this is done by installing two cover closures one above the other in the steel lining. Inlet and outlet pipes must then be led through these covers or through side passages in the pre-stressed concrete vessel. For many reasons, this last solution is undesirable.

To make things even more difficult, the widely differing temperatures at the time of erection and in operation cause considerable thermal expansion to take place in the connectng pipes between erection and operation.

SUMMARY OF THE INVENTION

This invention proposes to solve the problem of designing a heat exchanger for a nuclear unit in such a way that its installation is simple, that it has a high degree of operational safety and reliability, and that the previously described problems do not occur.

The invention solves this problem in placing the reaction tubes in a double walled vessel in the steel liner with the catalyst-free inlet and outlet pipes of the reaction tubes passing through the vessel covers or bottoms, respectively, either individually or in groups. The outlet pipes act as a heat exchanger in the double walled vessel space that is filled with water. The double walled vessel rests upon a circular bracket in the lower part of the steel liner, and the annular space between the steel liner and the vessel being doubly sealed by a double flange, the circular cover and the membrane ring above and by the double flange and two circular elements below. The annular space is sealed by a packing against the recycle gas nozzle.

One of the particular advantages and characteristics of this invention is that the reaction tubes of the heat exchanger are double walled, thus providing a double protection against the hot gases outside. The inner wall of the heat exchanger is adequately cooled. The water jacket fulfills a double function: on the one hand, the water serves as coolant and on the other, a supplementary element of safety is thereby provided. In addition, it is essential that the heat exchanger rests upon the circular bracket of the steel liner and thus remains in a fixed position. Since the reaction tubes pass through the cover either separately or in groups, they can be shut off singly or in sections, whereupon they no longer participate in the heat exchange. No interim dismantling of the tubes is necessary and the entire installation can thus remain in operation. The special construction of the passage through the bottom and cover assures a minimum of thermal stress. The double sealing, in conformity with the invention, that is assured by the annular elements and the pertaining sealing elements makes it possible for the inlet and outlet pipes for the reaction gas going to the heat exchanger with reaction tubes to be designed flexibly. A longitudinal expansion of the heat exchanger thus has no influence on the sealing properties of the inlet and outlet pipes.

By locating the seals in accordance with the invention in the upper and lower region of the cavern between the heat exchanger and steel liner it is possible to check the sealing from time to time without having to employ any special type of construction for the inlet and outlet pipes between the nuclear reactor and the heat exchanger.

Steam generators are usually found in chemical process installations with endothermic catalytic high temperature reactions and it is therefore essential from the standpoint of this invention simultaneously to generate steam in the heat exchanger with the reaction tubes, with the feedwater simultaneously serving as coolant for the heat exchanger.

The feedwater is heated on the one hand by cooling the reaction fluid that passes through the outlet pipes in the lower part of the double walled heat exchanger and on the other hand by the recycle gas that flows through the inside of the heat exchanger.

BRIEF DESCRIPTION OF THE DRAWING

The FIGURE is a vertical sectional view of a heat exchanger and showing a fragment of a cavern type nuclear reactor.

DESCRIPTION OF PREFERRED EMBODIMENT

A pre-stressed concrete vessel 1 of a nuclear reactor installation has several caverns 2 which are disposed radially and usually symmetrically around the reactor core, and of which only one is shown in the drawing as an example.

The steel liner 3 of the cavern, which is to accommodate the heat exchanger, must be able to be closed tightly for safety reasons. Consequently, the invention provides for a circular bracket 4 forming a part of the steel liner to support the double walled vessel 5 and both ends of the steel liner are equipped with two flanges each, those outside 6 and 6' and those inside 7 and 7'. The double walled vessel 5 is formed with an outer wall 8 and an inner wall 9. Reaction tubes 10 filled with catalyst are placed vertically within the inner wall 9 of the vessel 5. The inlet and outlet pipes 11 and 12 are without catalyst and enter the vessel through the top and bottom, either separately or in a group. The spacing between the two lower walls of the vessel 5 is such that the pipes that pass through are able to act as a heat exchanger. The intermediate space between the outer and inner walls of the double walled vessel 5 is filled with feedwater and serves as a steam generator. The design of these passages for the inlet and outlet pipes through the cover and bottom forms no part of the present invention.

The hot recylce gas having a temperature in the region of 950° C from the core of the high temperature nuclear reactor (not shown) passes into the pre-stressed concrete vessel 1 through a hot gas pipe 13 and a passage 14 of the vessel 5 into the interior of the vessel.

The hot gas is directed around the reaction tubes 10 by means of a known gas distribution or baffle device 15 and the gas temperature is lowered to about 700° C by transferring heat to the reaction fluid in the reaction tubes. The recycle gas leaves the heat exchanger through a passage 16 of the vessel and flows into another heat exchanger, for example a steam generator, through a cold gas tube 17. In this steam generator, the gas is cooled to 250° C and returned to the high temperature nuclear reactor where it is heated again.

The hot gas pipe 13 and the cold gas pipe 17 are not rigidly connected with the corresponding passages 14 and 16. In the free annular space 18 remaining between the steel lining or liner 3, and the outer vessel wall, only a single packing 19 is used in the region of the cold gas pipes. It will be understood that several packings could become necessary depending upon the size of the installation. This packing prevents a gas leak from the hot gas pipe 13 into the cold gas pipe 17, that is to say, it is rated to withstand the difference in pressure between the hot and cold gas. As the annular space 18 is filled with gas that cannot escape anywhere, this space acts as thermal insulation for the hot recycle gas stream from the hot gas pipe 13. A special sealing between the pipes 16 and 17 is not necessary. By a simple modification of its design, a packing 19 assures that the expansion and contraction of the double walled vessel 5, caused by the high operating temperature, have no effect on the operational capability.

The cylindrical part of the double walled vessel 5 may be replaced by a cylindrical membrane wall that is well known in boiler construction.

In order effectively to seal the free annular space 18, which is filled with gas, against the free atmosphere, and to make this sealing accessible, it is placed in the cover and the bottom of the cavern. The upper inner flange 7' of the steel lining is tightly connected with a membrane ring 21 via an annular hood 20, the membrane ring being welded to the outer wall 8. The double sealing of the free annular space is obtained by means of a cover 22 on the flange 6'. The lower double sealing between the impermeable steel liner 3 and the double walled vessel is obtained by the installation of two annular elements 23 and 24 on the corresponding flanges. The sealing of the various connecting points is effected by known means commonly used for this function. A pure gas acting as a sealing gas is introduced into the sealing gas space 25 and 26 in order to ensure that no recycle gas - even if cooled - can escape to the exterior. The gas pressure in these areas is calculated so as to be superior to the pressure of the hot gas, so that in case of a possible leakage in the flanges, the pure gas will in any case flow into the annular space 18.

Depending upon the thermal requirements, the vessel may be equipped on the inside with a thermal insulation layer (not shown). In this particular case, the amount of steam generated from the feedwater in the double wall of the vessel would be considerably less.

The two annular elements 23 and 24 can be designed in various manners following the requirements. The only necessity is to guarantee a proper sealing at the prevailing operating temperatures.

What I claim is:

1. Heat exchanger for a cavern-type nuclear reactor comprising
   a. a vertically disposed double-walled vessel in which the walls are spaced from each other and provided with an inlet and outlet for the outer vessel space,
   b. a plurality of reaction tubes within the inner space of said vessel, said tubes containing a gas-reforming catalyst through which material to be reformed flows,
   c. a metallic liner for the outside of said vessel providing an annular space therebetween,
   d. a bottom and a top cover for said vessel,
   e. catalyst-free inlet and outlet pipes for said reaction tubes entering said vessel through said bottom and top cover respectively,
   f. said outlet pipes passing through the lower double-walled vessel space to serve as a heat exchanger for same,
   g. vertically spaced inlet and outlet for the inner vessel space constituting recycle gas nozzles, and
   h. packing between the outer wall of said vessel and said liner for sealing said annular space against recycle gas flowing through said nozzles.

2. Heat exchanger as claimed in claim 1, comprising
   a. a bracket constituting part of said liner on which said vessel rests, and b. means associated with said bracket for providing a seal between said liner and said vessel.

3. Heat exchanger as claimed in claim 1, comprising
a. a membrane secured to the upper end of the outer vessel wall,
b. a hood secured at one end to the upper end of said metallic liner, and
c. a secure connection between the other end of said hood and said membrane, thereby to seal the upper end of the space between the liner and the vessel.

4. Heat exchanger as claimed in claim 3, comprising
a. a forked extension on the upper end of said liner,
b. a flange on each end portion of said extension,
c. a flange on said cover securely connected to the outer flange of said fork, and
d. a flange on said hood securely connected to the inner flange of said fork.

5. Heat exchanger as claimed in claim 1, in which double seals are provided at opposite ends of said liner and adjacent vessel parts.

* * * * *